G. H. MAAS.
FRUIT JAR HOLDER.
APPLICATION FILED APR. 1, 1912.
1,069,710.
Patented Aug. 12, 1913.
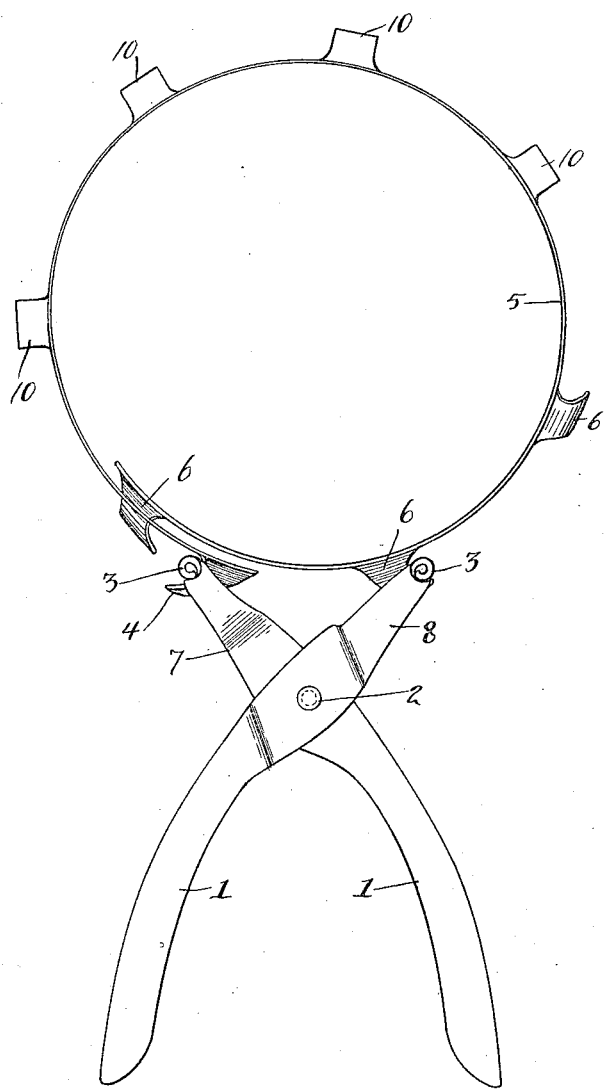
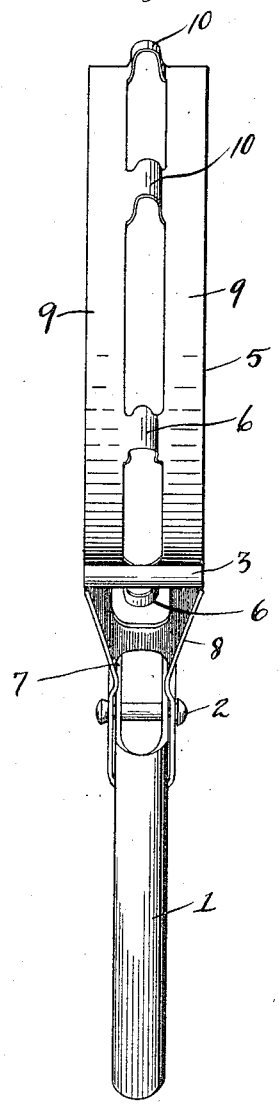

UNITED STATES PATENT OFFICE.

GEORGE H. MAAS, OF MILWAUKEE, WISCONSIN.

FRUIT-JAR HOLDER.

1,069,710.  Specification of Letters Patent.  Patented Aug. 12, 1913.

Application filed April 1, 1912. Serial No. 687,903.

*To all whom it may concern:*

Be it known that I, GEORGE H. MAAS, a citizen of the United States, residing at Milwaukee, county of Milwaukee, and State of Wisconsin, have invented new and useful Improvements in Fruit-Jar Holders, of which the following is a specification.

My invention relates to improvements in fruit jar holders, and it pertains to that class which are adapted to grasp the vertical surface of a glass or other class of fruit jar, and hold the latter as the cover is being screwed on and off of the same.

My invention is further explained by reference to the accompanying drawings, in which—

Figure 1 represents a front view and Fig. 2 a side view thereof.

Like parts are identified by the same reference numerals throughout both views.

1, 1 represent the handles which are pivotally connected together at a distance from their ends by the rivet 2, and the ends of said handles are respectively provided with transversely arranged bars 3, 3, one of which is adapted to engage with the hook 4 formed at one end of the clamping band 5, and the other is adapted to engage with the several hooks 6, 6 formed in connection with the opposite end of said clamping band as the latter is being used on jars of different sizes.

I am aware of the fact that handles of similar construction have previously been used in connection with a clamping band, in which case one of the arms 7 of the handles has been permanently connected with one end of said band, while the opposite arm 8 of said handles has been detachably connected with the opposite end of said band in a similar manner. Invention herein is predicated more especially upon the construction by which both ends 7 and 8 of said handles may be readily detached from said band, whereby the handles may be placed within the clamping band and thereby occupy less space when packing and shipping the same. Invention herein is further predicated upon forming the clamping band 5 of two parallel members 9, 9, which are connected together at slight intervals apart by the hooks 4 and 6 and transverse members 10. It will be understood that said hooks and transverse members are formed integrally with the parallel members 9, and that they project outwardly from the side of said parallel members 9, whereby they are prevented from coming in contact with the jar as the jar is being gripped and held thereby, and whereby the ends of the handles 7 and 8 are also prevented from contacting with the jar as the latter is being gripped by said band, and whereby the liability of the jar being broken when made of glass or other fragile material is avoided.

Having thus described my invention, what I claim as new, and desire to secure by Letters Patent, is—

1. In a jar holder of the class described, a clamping band adapted to grasp the periphery of a fruit jar, comprising two parallel side members connected together at their ends and at intermediate points between their ends by a plurality of integrally formed transverse members, a hook formed integral with a plurality of said transverse members, and means for detachably connecting the respective ends of said clamping band with an operating handle.

2. In a jar holder of the class described, the combination of a pair of handles pivotally connected together at a distance from one of their ends, a clamping band comprising two parallel side members connected together at their ends and at intermediate points between their ends by a plurality of transverse members, a hook formed integrally with the transverse member at one end of said band, said hook being adapted to detachably engage one end of one of said handles, and a plurality of hooks formed integrally with a part of the other transverse members of said band, said hooks being adapted to be interchangeably connected with one of said handles, and thereby adjusted to fit jars of different sizes, all substantially as and for the purpose specified.

In testimony whereof I affix my signature in the presence of two witnesses.

GEORGE H. MAAS.

Witnesses:
 JAS. B. ERWIN,
 H. C. VAN RYN.

Copies of this patent may be obtained for five cents each, by addressing the "Commissioner of Patents, Washington, D. C."